US006968434B2

(12) United States Patent
Kamano et al.

(10) Patent No.: US 6,968,434 B2
(45) Date of Patent: *Nov. 22, 2005

(54) METHOD AND APPARATUS FOR CONTROLLING ACCESS TO STORAGE DEVICE

(75) Inventors: Toshimitsu Kamano, Odawara (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,915

(22) Filed: Apr. 30, 2003

(65) Prior Publication Data

US 2003/0196055 A1 Oct. 16, 2003

Related U.S. Application Data

(63) Continuation of application No. 09/764,286, filed on Jan. 19, 2001, now Pat. No. 6,606,695.

(30) Foreign Application Priority Data

May 24, 2000 (JP) .............................. 2000-157954

(51) Int. Cl.[7] .......................................... G06F 12/00
(52) U.S. Cl. ................... 711/163; 711/164; 709/217; 709/219; 709/224; 709/225; 713/200; 713/201; 713/202
(58) Field of Search ................................ 711/163, 164; 709/217, 219, 224, 225; 713/200, 201, 202

(56) References Cited

U.S. PATENT DOCUMENTS

| 4,144,583 A | 3/1979 | Lawson |
| 4,914,656 A | 4/1990 | Dunphy, Jr. et al. |
| 4,989,205 A | 1/1991 | Dunphy, Jr. et al. |
| 5,077,736 A | 12/1991 | Dunphy, Jr. et al. |
| 5,124,987 A | 6/1992 | Milligan et al. |
| 5,163,096 A | 11/1992 | Clark et al. |
| 5,210,844 A | 5/1993 | Shimura et al. |
| 5,237,668 A | 8/1993 | Blandy et al. |
| 5,239,632 A | 8/1993 | Larner |
| 5,274,783 A | 12/1993 | House et al. |
| 5,282,247 A | 1/1994 | McLean et al. |
| 5,297,268 A | 3/1994 | Lee et al. |
| 5,469,564 A | 11/1995 | Junya |
| 5,528,584 A | 6/1996 | Grant et al. |

(Continued)

FOREIGN PATENT DOCUMENTS

EP 0709988 5/1996

(Continued)

OTHER PUBLICATIONS

Smith et al "Tachyon: a gigabit Fibre Channel Protocol Chip", Hewlett-Packard Journal, vol. 47, No. 5, Oct. 1996, pp. 94-98, internet copy.

(Continued)

*Primary Examiner*—Donald Sparks
*Assistant Examiner*—Ngoc V. Dinh
(74) *Attorney, Agent, or Firm*—Mattingly, Stanger, Malur & Brundidge, P.C.

(57) ABSTRACT

The storage regions under command of a storage controller can be simply enabled and disabled to access to by automatically registering connected host computers. Such system can be achieved by taking a step of acquiring N_Port_Name information included in a login frame from the host computers, and a step of displaying a table of access right of host computers to a logical unit under command of storage controller. A security table for the storage controller can be generated by supervisor's setting the access enable/disable flag information.

25 Claims, 11 Drawing Sheets

U.S. PATENT DOCUMENTS

| | | |
|---|---|---|
| 5,533,125 A | 7/1996 | Bensimon et al. |
| 5,548,783 A | 8/1996 | Jones et al. |
| 5,610,745 A | 3/1997 | Bennett |
| 5,610,746 A | 3/1997 | Ranalli |
| 5,617,425 A | 4/1997 | Anderson |
| 5,623,637 A | 4/1997 | Jones et al. |
| 5,634,111 A | 5/1997 | Oeda et al. |
| 5,644,789 A | 7/1997 | Matthews et al. |
| 5,651,139 A | 7/1997 | Cripe et al. |
| 5,657,445 A | 8/1997 | Pearce |
| 5,663,724 A | 9/1997 | Westby |
| 5,748,924 A | 5/1998 | Llorens et al. |
| 5,768,530 A | 6/1998 | Sandorfi |
| 5,768,623 A | 6/1998 | Judd et al. |
| 5,805,800 A | 9/1998 | Kotani et al. |
| 5,805,920 A | 9/1998 | Sprenkle et al. |
| 5,809,279 A | 9/1998 | Oeda et al. |
| 5,809,328 A | 9/1998 | Nogales et al. |
| 5,812,754 A | 9/1998 | Lui et al. |
| 5,835,496 A | 11/1998 | Yeung et al. |
| 5,848,251 A | 12/1998 | Lomelino et al. |
| 5,872,822 A | 2/1999 | Bennett |
| 5,894,481 A | 4/1999 | Book |
| 5,913,227 A | 6/1999 | Raz et al. |
| 5,941,969 A | 8/1999 | Ram et al. |
| 5,941,972 A | 8/1999 | Hoese et al. |
| 6,006,342 A | 12/1999 | Beardsley et al. |
| 6,041,381 A | 3/2000 | Hoese |
| 6,061,750 A | 5/2000 | Beardsley et al. |
| 6,061,753 A | 5/2000 | Ericson |
| 6,105,092 A | 8/2000 | Oeda et al. |
| 6,118,776 A | 9/2000 | Berman |
| 6,119,121 A | 9/2000 | Zhu ............ 707/101 |
| 6,185,203 B1 | 2/2001 | Berman |
| 6,195,703 B1 | 2/2001 | Blumenau |
| 6,209,023 B1 | 3/2001 | Dimitroff et al. ........ 709/211 |
| 6,219,771 B1 | 4/2001 | Kikuchi et al. |
| 6,263,445 B1 | 7/2001 | Blumenau |
| 6,295,575 B1 * | 9/2001 | Blumenau et al. .......... 711/5 |
| 6,343,324 B1 | 1/2002 | Hubis et al. |
| 6,356,979 B1 | 3/2002 | Sicola et al. |
| 6,389,432 B1 | 5/2002 | Pothapragada et al. |
| 6,421,711 B1 | 7/2002 | Blumenau et al. |
| 6,421,753 B1 | 7/2002 | Hoese |
| 6,425,035 B2 | 7/2002 | Hoese |
| 6,425,036 B2 | 7/2002 | Hoese |
| 6,438,648 B1 | 8/2002 | McKean et al. |
| 6,446,141 B1 | 9/2002 | Nolan et al. |
| 6,484,229 B1 | 11/2002 | Ichikawa et al. |
| 6,484,245 B1 | 11/2002 | Sanada et al. |
| 6,493,347 B2 | 12/2002 | Sindhu et al. |
| 6,499,075 B2 | 12/2002 | Oeda et al. |
| 6,502,162 B2 | 12/2002 | Blumenau et al. |
| 6,523,096 B2 | 2/2003 | Sanada et al. |
| 6,538,669 B1 | 3/2003 | Lagueux, Jr. et al. |
| 6,553,408 B1 | 4/2003 | Merrell et al. |
| 6,571,354 B1 | 5/2003 | Parks et al. |
| 6,574,667 B1 | 6/2003 | Blumenau |
| 6,591,356 B2 | 7/2003 | McMurdie et al. ........ 711/206 |
| 6,598,174 B1 | 7/2003 | Parks et al. |
| 6,606,695 B2 * | 8/2003 | Kamano et al. ........... 711/163 |
| 6,609,180 B2 | 8/2003 | Sanada et al. |
| 6,633,962 B1 * | 10/2003 | Burton et al. ............... 711/163 |
| 6,640,278 B1 | 10/2003 | Nolan et al. |
| 6,643,748 B1 | 11/2003 | Wieland |
| 6,654,830 B1 | 11/2003 | Taylor et al. |
| 6,665,714 B1 | 12/2003 | Blumenau et al. |
| 6,671,776 B1 * | 12/2003 | DeKoning ................. 711/114 |
| 6,684,209 B1 * | 1/2004 | Ito et al. ...................... 707/9 |
| 6,742,034 B1 | 5/2004 | Schubert et al. |
| 2001/0020254 A1 * | 9/2001 | Blumenau et al. |

FOREIGN PATENT DOCUMENTS

| | | |
|---|---|---|
| EP | 0881560 | 12/1998 |
| JP | 1181139 | 7/1989 |
| JP | 3105419 | 5/1991 |
| JP | 3152650 | 6/1991 |
| JP | 5128030 | 5/1993 |
| JP | 5181609 | 7/1993 |
| JP | 5225068 | 9/1993 |
| JP | 5324445 | 12/1993 |
| JP | 6095359 | 4/1994 |
| JP | 6214863 | 8/1994 |
| JP | 8115279 | 5/1996 |
| JP | 63253448 | 10/1998 |
| JP | 10333839 | 12/1998 |

OTHER PUBLICATIONS

Gibson et al, "A Case for Network-Attached Secure Disks", Document CMU-CS-96-142, School of Computer Science, Carnegie Mellon University, Sep. 26, 1996, pp. 1-19.

Gibson et al "File Server Scaling with Network-Attached Secure Disks" Proceedings of the 1997 ACM Sigmetrics International Conference on Measurement & Modeling of Computer Systems, Jun. 1997, pp. 272-284.

Van Meter III, "A Brief Survey of Current Work on Network Attached Peripherals", ACM SIGOPS, Operating Systems Review, v. 30, n. 1, Jan. 1996, pp. 63-70, internet copy.

"Performance Efficient Multiple Logical Unit Number Mapping for Redundant Array of Independent Disks", IBM Technical Disclosure Bulletin, May 1996, pp. 273-274.

J. Wilkes, et al, "The HP AutoRAID Hierarchical Storage System", ACM Transactions on Computer System, vol. 14, No. 1, Feb. 1996, pp. 108-136.

E. Lee, et al "Petal: Distributed Virtual Disks", Systems Research Center, Digital Equipment Corp., ASPLOS, VII Oct. 1996, pp. 84-92.

* cited by examiner

FIG.7A

| | WWN | S_ID | ~200 |
|---|---|---|---|
| HOST A | 01234567 89ABCDEF | FFFF01 | |
| HOST B | 01234567 89ABCDEE | FFFF02 | |
| HOST C | 01234567 89ABCDED | FFFF03 | |

FIG.7B

| | ACCESS PERMIT / DENY | | ~201 |
|---|---|---|---|
| | LU 0 | LU 1 | |
| HOST A | ENABLE | DISABLE | |
| HOST B | DISABLE | ENABLE | |
| HOST C | DISABLE | ENABLE | |

FIG.7C

| | ACCESS PERMIT / DENY | | ~202 |
|---|---|---|---|
| | LU 0 | LU 1 | |
| VENDOR A | DISABLE | ENABLE | |
| VENDOR B | ENABLE | DISABLE | |

FIG.7D

| WWN | S_ID | ACCESS PERMIT / DENY | | ~700 |
|---|---|---|---|---|
| | | LU 0 | LU 1 | |
| 01234567 89ABCDEF | FFFF01 | ENABLE | DISABLE | |
| 01234567 89ABCDEE | FFFF02 | DISABLE | ENABLE | |
| 01234567 89ABCDED | FFFF03 | DISABLE | ENABLE | |

METHOD AND APPARATUS FOR CONTROLLING ACCESS TO STORAGE DEVICE

CROSS-REFERENCE TO RELATED APPLICATION

The present application is a continuation of application Ser. No. 09/764,286, filed Jan. 19, 2001, now U.S. Pat. No. 6,606,695, and is related to U.S. application Ser. No. 09/085,864, filed May 28, 1998, the contents of which are incorporated herein by reference.

BACKGROUND OF THE INVENTION

The present invention generally relates to security setting for prevention of illegal access between information processors. Particularly, the invention relates to a storage system for prevention of illegal access when a request occurs to access to a storage region under command of a storage controller in a computer system having a network provided between a high-rank unit (host computer) and the storage controller (storage system), and relates to the computer system including this storage system.

In the fiber channel protocol standardized by ANSI, X3T11, a great number of apparatus can be connected, and a large variety of protocols such as SCSI, ESCON and TCP/IP can be simultaneously operated. However, when it is feared that data in storage devices is destroyed by an access which a different file system makes due to a different kind of protocol, it is necessary to take a security measure against that.

To assure this security, as described in JP-A-10-333839, a table showing information for uniquely identifying host computers and to either permit or reject access to storage regions under command of a storage controller is provided within the storage controller. At the time of access, by referring to this table, it is possible to reject the access from the other apparatus than the host computers that are permitted to access, and hence prevent illegal access.

This identifycation information is an array of 48-bit digits called N_Port_Name, unique to each host bus adapter. Under the condition that the identification information for host computers are previously registered within the storage controller, the host computers can make access to storage regions within a storage device under command of the storage controller.

In order to previously register the host computer identifying information within the storage controller, the user or supervisor is first required to examine the N_Port_Name expressed by 48-bit digits that has an eight-byte region peculiar to a host computer by use of a manager connected to host computers through LAN. Then, it is necessary that this number be noted and registered in the storage controller by his own hand. Therefore, it is feared that if a wrong N_Port_Name is registered by mistake as the correct one of a host computer, this host computer cannot access to a storage region or an undesired host computer might make access to a storage region and destroy data.

Moreover, when information of either permitting or rejecting access to a large number of host computers is registered, it takes much time. Therefore, it is desired that this identification information be simply acquired and set.

SUMMARY OF THE INVENTION

Accordingly, it is an object of the invention to provide a system capable of acquiring information that uniquely identifies the connected host computers and automatically registering it within a storage controller, thereby making it possible simply to either permit or reject access to storage regions under command of the storage controller.

To achieve the above object, according to the invention, the host-identifying information is first acquired from a frame transmitted from the corresponding host computer, and registered in the storage controller, and then flag information is set to change for permitting that host computer to access by the supervisor's operation.

BRIEF DESCRIPTION OF THE DRAWINGS

FIGS. 7A, 7B, 7C and 7D show examples of the security table.

DESCRIPTION OF THE EMBODIMENTS

Embodiments of the invention will be described with reference to the accompanying drawings.

A description will be made of a computer system constructed by use of a storage controller and magnetic disk units as a storage system according to the present invention, and a network constructed by providing a fiber channel between the storage system and host computers, or a computer system under the so-called SAN (Storage Area Network) environment.

The fiber channel is a protocol having a serial transfer system with no own command set. Since it sends information asynchronously, the frequency bands of transmission media can be effectively used. In addition, instead of having no own commands, a physical transfer system is used as a carrying way for a command set such as SCSI or ESCON, thereby making it possible to faster transfer data of various kinds while the background art resources are being inherited.

Figure 1:
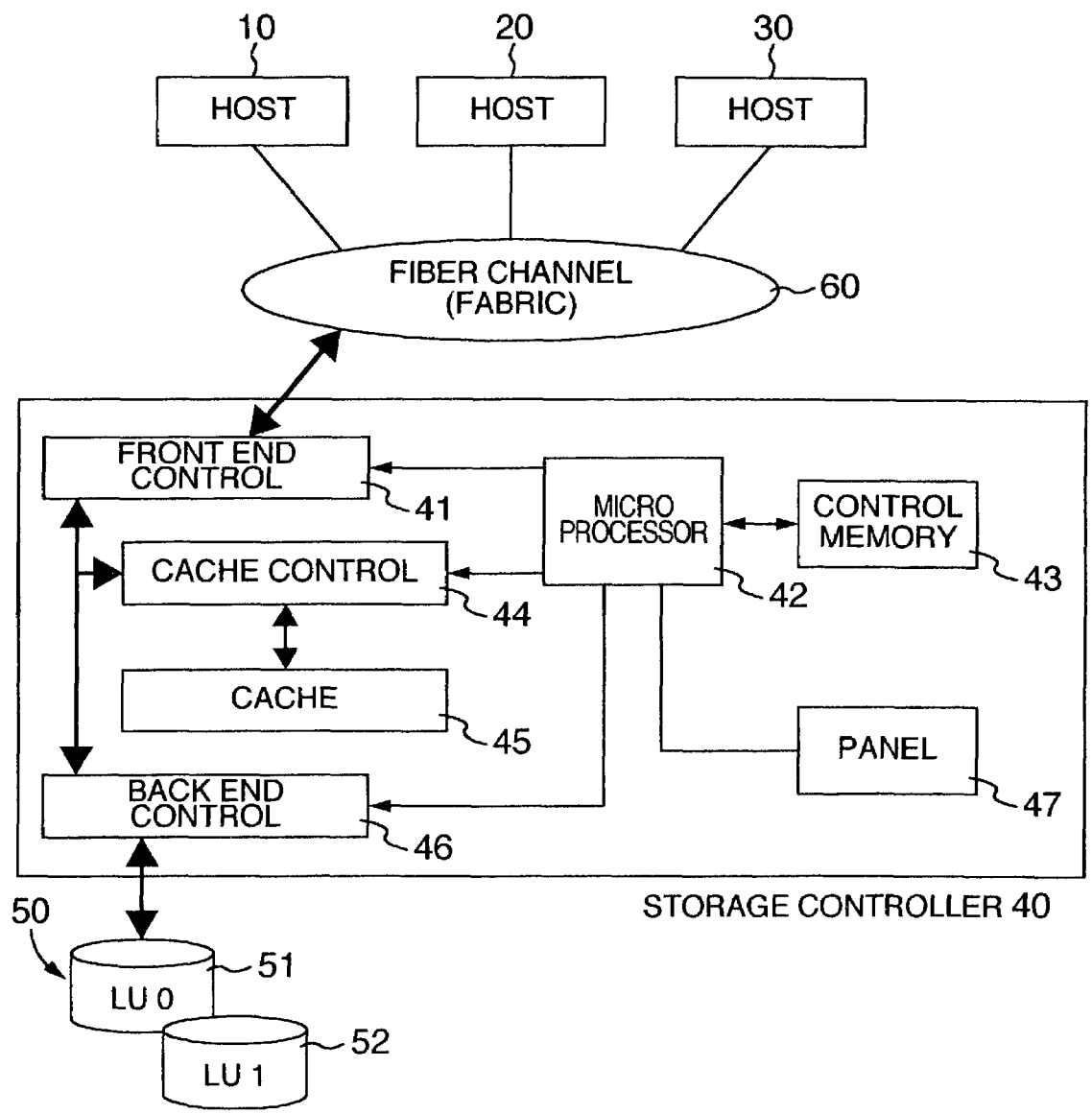
FIG. 1 is a block diagram showing a hardware structure of an embodiment of the invention.

FIG. 1 is a block diagram showing a hardware structure of a computer system according to the invention. Referring to FIG. 1, there are shown host computers 10, 20, 30, each acting as a central processing unit for performing data processing. A plurality of magnetic disk drives 50 are storage units with storage media that are connected in an array under command of a storage controller 40. The storage controller 40 is a disk array system for controlling these magnetic disk drives 50.

The storage controller 40 is constructed by a front end control unit (channel adapter) 41 for controlling the fiber channel protocol to the host computers 10, 20, 30, a microprocessor 42 for controlling all the storage controller 40, a nonvolatile control memory 43 for storing a microprogram for controlling the operation of storage controller 40, data for control and each table described later, cache 45 for temporarily storing (buffering) data, a cache control unit 44 for controlling this cache 45 to read and write data, a back end control unit (disk adapter) 46 for controlling a protocol used to the magnetic disk drives 50 to control data transfer to or from the magnetic disk drives 50, and a panel 47 on which information is set.

The magnetic disk drives 50 are expressed as logically divided regions. In the SCSI protocol, these regions are called LU (Logical Unit), and numbered by LUN (Logical Unit Number). In this embodiment, two regions of LU0 (51) and LU1 (52) are shown as LU of LU0 and LU of LU1.

The host computers 10, 20, 30 and the storage controller 40 are connected through a fiber channel 60 as an interface i.e., via a switch called "Fabric".

The operation of the system shown in FIG. 1 will be described. As an example of this operation, it is assumed that data is transferred between the host computer 10 and the LU0 (51) provided within the disk drive 50 through the storage controller 40. The host computer 10 logins the storage controller 40. Then, when the host computer 10 issues an access request (I/O request) to the LU0 (51), the front end control unit 41 that received this request sends an interruption request to the microprocessor 42. The microprocessor 42 controls the control memory 43 to store command information from the host computer 10 and information for identifying the host computer 10. When the host computer 10 is previously permitted to access to the LU0 (51), the microprocessor 42 confirms the command type.

When the confirmed command is Read command, the microprocessor 42 decides if the data block to be accessed exists in the cache 45. If this data exists, it is transferred to the host computer 10, and the end sign is sent to the host computer 10. If the data is not present, the back end controller 46 is operated to read the data block from the LU0 (51), and the cache control unit 44 controls the read data to be stored in the cache 45. Then, the microprocessor 42 orders the front end control unit 41 to transfer the data stored in the cache 45 to the host computer 10, and to report the end sign to the host computer 10.

If the confirmed command is Write command, the microprocessor 42 controls the cache 45 to store the data to be written, and sends the end sign to the host computer 10. Then, the cache control unit 44 is used to send this data to the LU0 (51) and completely write therein.

Figure 2:
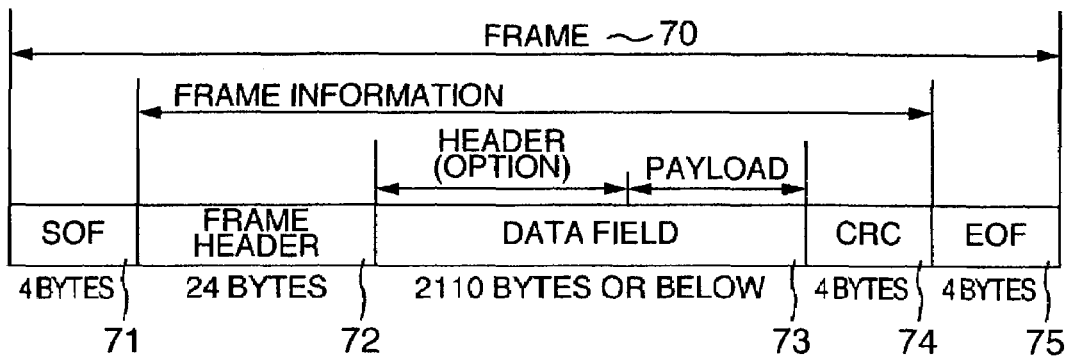
FIG. 2 is a diagram showing the format of a frame.

The basic unit of data that the fiber channel handles is called frame. This frame will be described with reference to FIG. 2. As shown in FIG. 2, a frame 70 is formed of a start-of-frame (SOF) 71, a frame header 72 of 24 bytes for link operation control and for characterizing the frame, a data field 73 of data itself to be actually transferred, a cyclic redundancy check (CRC) 74 of 4 bytes, and an end-of-frame (EOF) 75. The data field 73 is variable in the range from 0 to 2112 bytes.

Figure 3:
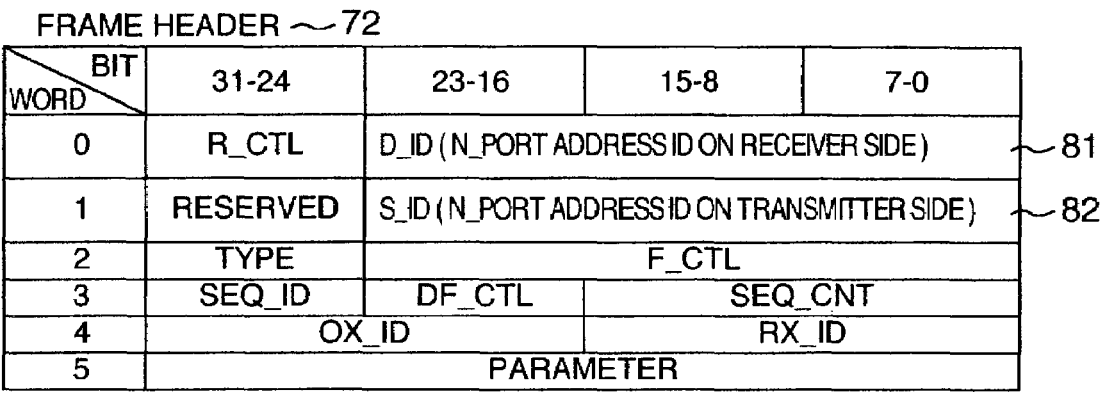
FIG. 3 is a diagram showing the details of the frame header.

The SOF 71 is an identifier of 4 bytes placed at the head of the frame. The EOF 75 is an identifier of 4 bytes placed at the back of the frame. The SOF 71 and the EOF 75 define the frame. A signal of idle flows in the fiber channel when there is no frame. FIG. 3 shows the format 80 of the frame header 72.

The format of the frame header 72 will be described below with reference to FIG. 3. The frame header 72 is formed of six words of 32 bits each. A destination identifier D_ID (Destination ID) 81 of 23rd—0th bit of word 0 is an address identifier for the frame receiving side. A source identifier S_ID 82 of 23rd—0th bit of word 1 is an address identifier of three bytes for identifying a port of the transmission source of the frame. This identifier has a meaningful value in all frames transmitted and received. The S_ID 82 is the information capable of dynamically and uniquely identifying a host computer, and is a value reported from the host computer at the time of PLOGI (described later). However, this S_ID 82 is, for example, a value dynamically changing each time the system is started, and assigned at the time of initialization by Fabric in FC-PH (Fiber Channel Physical and Signaling Interface: US standard of fiber channel). The value to be assigned deponds on N_Port_Name and Node_Name which each port has.

The kind of frame is roughly divided into data frame and link control frame on the basis of the function. The data frame is used for information transfer, and has data and commands provided at the payload section of the data field for use in a high-rank protocol. The link control frame is generally used for indicating if the frame transmission has been successfully or unsuccessfully made. As an example of the link control frame, there is a frame for indicating that a single frame has received or a frame for notifying parameters of transfer at the time of log-in.

In the fiber channel interface, a host computer sends to a device a frame of port log-in PLOGI (N_Port Login) command including a communication parameter, and the device accepts this frame, thus communications being made possible. This is called login.

A description will be made of the format of PLOGI frame that is a communication request of a certain host computer to the storage controller 40. In the data field 73, the first 8-bytes region of the twentieth to twenty-seventh byte (fifth to sixth word) is a region for storing the N_Port_Name, and the second 8-bytes region of the twenty-eighth to thirty-fifth byte (seventh to eighth word) is a region for storing the Node_Name.

The device sends to the host computer a frame called ACC (Accept) at the time of accepting the request, or LS_RJT (Link Service Reject) at the time of rejecting the request.

Figure 4:
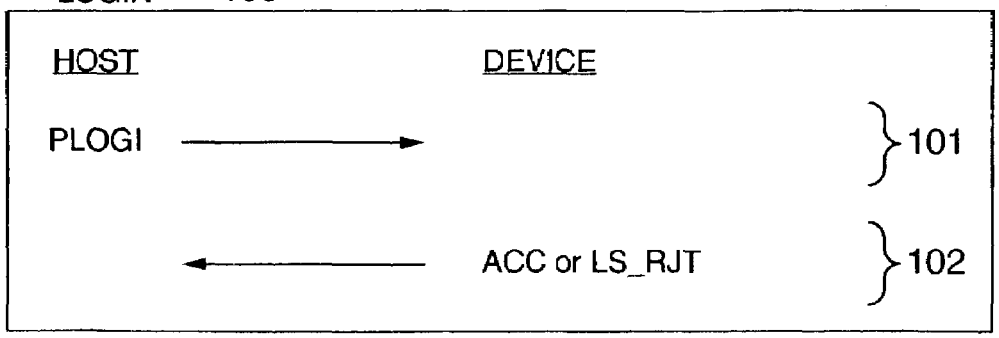
FIG. 4 is a diagram showing the sequence of log-in between host computer and device.

FIG. 4 shows a login sequence 100. The host computer as a source of login request sends the PLOGI frame to the storage controller 40 of a device as a destination of login request. This PLOGI frame has its frame header 72 including S_ID 82 and other information, and its data field 73 including the N_Port_Name and Node_Name of the login request source.

The storage controller 40 takes information out of this PLOGI. When accepting the login, it transmits ACC frame to the source of login request. When rejecting the login, the storage controller 40 transmits to the host computer a frame called LS_RJT against the PLOGI frame.

The security information acquisition and automatic registration according to the invention will be described with reference to FIG. 5. Here, in place of N-Port_Name, WWN (World Wide Name) that is similarly expressed by an array of 48-bit digits is used as transmission source identifying information. The WWN has a value of 8 bytes peculiar to each apparatus as does the N_Port_Name. It may include Port_Name peculiar for each port and Node_Name peculiar to each node.

After a peripheral unit such as storage controller 40 is first started, the host computer 10, 20, 30 is started up (step 501). Each host computer issues a PLOGI frame as a login request frame including N_Port_Name information peculiar to each host.

The microprocessor 42 of the storage controller 40 receives the frame sent through the port (not shown) of the front end control unit 41 (step 502). Then, the microprocessor 42 cuts off the WWN information out of the frame, forces the buffer (not shown) of the cache 45 to store that information, and refers to a port security table (host computer information table) 200 defined within the control memory to see if it is already registered in the WWN list of the table 200 (step 503). The frame at the time of actual I/O request (Inquiry) which will be described later has no N_Port_Name added, but only S_ID added the value of which changes for each time of starting. Thus, the microprocessor 42 cuts off S_ID out of the frame header of PLOGI, and WWN out of the data field, and generates the security table (host computer information table) 200, as shown in FIG. 7A, to enable N_Port_Name to be pulled out of S_ID at the time of Inquiry. This table is stored in the control memory 43. It is assumed that the part of list in which the WWN information of port security table 200 is stored has initially a value irrespective of the WWN information as a default. Each time each of the host computers issues PLOGI frame, the WWN (or N_Port_Name) and S_ID included in the PLOGI frame are automatically registered in the security table 200.

If it is decided to be false (YES at step 503'), the cut-off WWN information of host bus adapters 11, 21, 31 of host computers 10, 20, 30, assumed as host A, host B and host C, are stored in the security table 200 successively (step 504). Since the WWN information inserted within the frame the host computer 10, 20, 30 has issued does not agree with the values registered as default within the table 200, the microprocessor 42 of the storage controller 40 sends LS_RJT frame having a reject parameter for rejection against the connection back to the host computer 10, 20, 30 (step 505).

Since the storage controller 40 cannot accept the I/O of host computer 10, 20, 30 at the time of newly starting as describe above, the panel 47 is used to assign those host computers to the respective ports of the front end control unit 41 that the storage controller 40 can permit to access to the ports. The supervisor uses the panel 47, and orders it to perform a port security change task for port in order that the host computer 10 can access to the controller via a port of front end control unit 41. When a port security change window is brought about by pushing keys of a key area 472 of panel 47, WWN information is displayed in the order of automatic registration on the WWN column of table 200.

Figure 8:
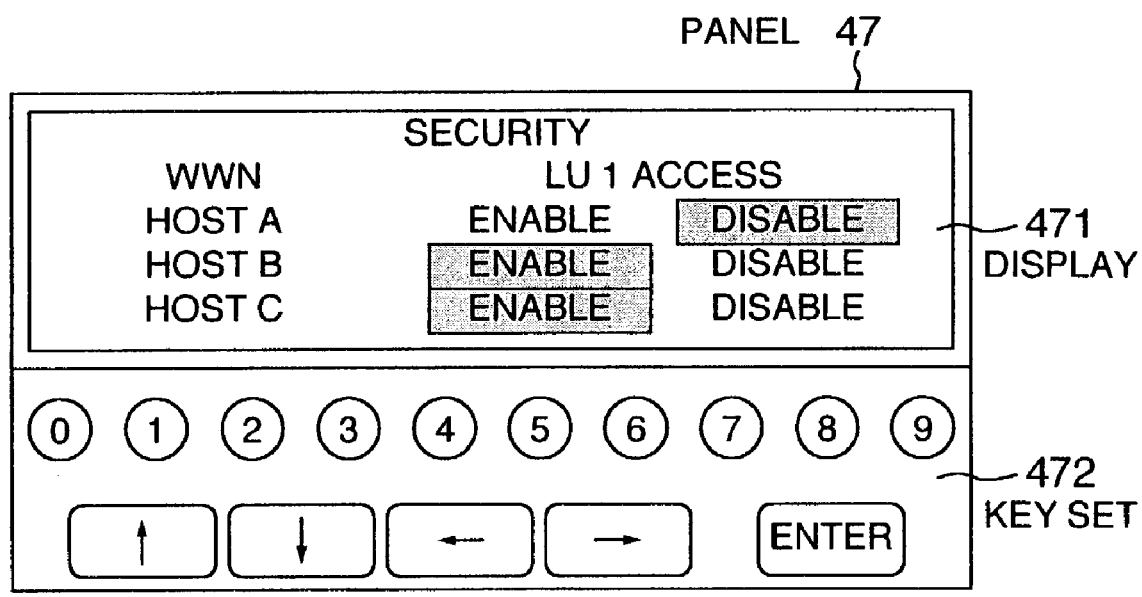
FIG. 8 is a diagram showing an example of the display panel used at the time of registering security information.

As shown in FIG. 8, the automatically registered Host A, host B and host C are displayed on the panel screen. The supervisor operates keys to select the Host A as WWN information of host bus adapter 11 of host computer 10, and to select the Enable of the port access permit/reject pair flag information on the table, thus enabling the host to access. This port access permit/reject flag information is previously set to be Disable as default. Similarly, the access from host computers 20 and 30 can be enabled (steps 506, 507, 508, 514). An example of how to enter is shown in FIG. 8. The panel 47 is shown in FIG. 8. In the panel 47, a display 471 is shown to indicate the automatically registered host computers (in this case, Host A and Host B are already registered, and Host C is to be newly registered). When Host C is selected by pushing the arrow keys of the key set 472, the LU access permit/reject flag information can be set to be Enable or Disable. Then here the supervisor selects Enable thus enabling this host to access. It is better to set Disable as the default of this LU access permit/reject flag information. The key set 472 may have keys for numerals that allow WWN to be manually inputted by hand as in the background art. In FIG. 8, for the sake of simplicity, a single LU (storage region) is shown.

Next, the host computers 10, 20, 30 make re-recognition processing for the connected devices (step 514).

The host computer 10, 20, 30 again issues PLOGI frame as a login request frame, and the microprocessor 42 of storage controller 40 receives the frame fed through a port of front end control unit 41 (step 502). Then, the microprocessor 42 cuts off the WWN information out of the frame, and compares it with the WWN information list within the port security table 200 (steps 503, 503'). When it is decided to agree because it is already registered (NO of step 503'), the microprocessor sends back to the host computer 10, 20, a frame indicating that login is possible. Thereafter, login processing is continued, and the storage regions 51, 52 under command of storage controller 40 can be accessed by the host computers 10, 20, 30 (steps 515 to 517).

At step 503', when it is recognized that a new host computer is connected, that the new host computer has been corrected is indicated on the panel display. At this time, the supervisor is urged to make mode selection for the registration in the security table. The modes that can be selected at step 506 include a mode in which WWN itself is used to register, and a mode in which Company_ID included in WWN is used to register. The fact that a new host computer has been connected may be indicated by means of blinking on the display, guide using voice or other ways that the supervisor can perceive.

The Company_ID will be described. The N_Port_Name of 8 bytes includes Company_ID (selected when a four-bit area of 60th bit to 63rd bit has a particular value) in a 24-bit area of 36th bit to 59th bit, and VS_ID (Vendor Specific Identifier) in a 36-bit area of 0th bit to 35th bit. Here, a unique value is allocated to the Company_ID of each vendor. That is, the same vendor has the same value.

Under the security for preventing data damage by I/O from a host computer having a different protocol and different file system, the same device can be often accessed by host computers of the same vendor. Therefore, there will be often no trouble even if security is set up for each vendor. Thus, since the access enable/disable conditions can be provided for a unit of a plurality of host computers, the security table (access enable/disable table) can be more easily generated.

When the supervisor selects the registration of WWN (of each of a plurality of host computers to be registered), and when any security table is not generated yet, e.g., when the system is started, the microprocessor 42 recognizes LU that is a storage region under command of storage controller 40. Then, it generates a security table (access enable/disable table) 201 of host computes and LU as shown in FIG. 7B. If the security table 201 is previously generated, e.g., when a host computer is added or restarting is made, a host computer corresponding to a new WWN is added to the security table 201, thus a new security table being generated.

This security table 201 is shown in the display of panel 47 (step 507). The supervisor inputs only access enable or disable designation for the host computers on the table by use of the panel 47 (step 508).

When the supervisor selects the registration of each vendor, the microprocessor 42 cuts Company_ID off out of WWN (step 509). Then, an access enable/disable table 202 of vendor and LU as shown in FIG. 7C is generated and displayed as at step 507 by use of this Company_ID (step 510). The supervisor enters only the access enable or disable designation for the host computers on the table by use of panel 47 (step 511).

Since the security table 201 shows the relation between the host (WWN) and LU, the access enable and disable designation for the host computers (WWN) each having a Company_ID are automatically entered with reference to the access enable/disable table 202 generated at step 511, thus replacing the process at step 507 (step 512).

Thus, the security table 201 is completely set up by the above input operation and updated (step 513).

After updating the security table 201, the microprocessor 42 issues GPN_ID (Get_Port_Name) to host computers, causing the host computers to issue PLOGI (step 514).

Since a new WWN is not handled this time, NO is selected at step 503', and the process goes to step 515.

When WWN is known at step 503', login continues, and it is decided if this WWN can login in storage controller 40. For this purpose, with reference to security table 201 it is decided if this WWN has right to access to a given LU (LU0 or LU1 in FIG. 1) under command of storage controller 40 (step 515).

ACC is sent back to the host computer in which the access right is already set (step 516), and login operation is completed (step 517).

LS_RJT is transmitted back to the host computer that has no access right (step 518), and login is rejected (step 519).

When a plurality of host computers are newly connected, e.g., when the system is initially started, the supervisor cannot recognize which host computer corresponds to a WWN. Therefore, at step 506, when registration is made for each WWN, the relation between host and WWN is checked from the SAN manager separately connected to the system. Under this checking, the supervisor can generate the security table 201 by only entering the presence or absence of the access right.

Figure 13:
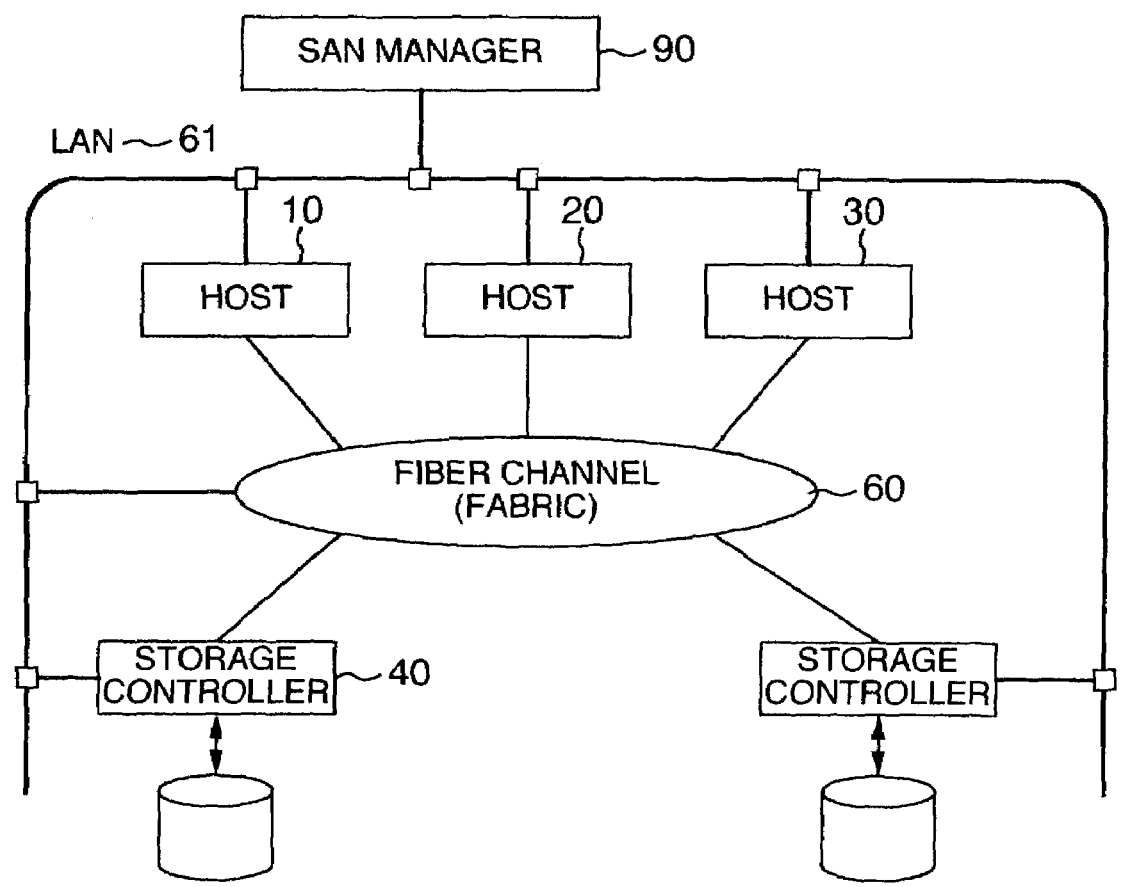
FIG. 13 is a diagram showing a computer system having SAN manager.

The SAN manager will be described with reference to FIG. 13. The host computers 10, 20, 30 and the storage controller 40 are also connected through a local area network (LAN) 61 other than the fiber channel Fabric 60. SAN manager unit 90 and the fiber channel Fabric 60 are also connected to this LAN 61. The SAN manager unit 90 is PC or WS, and acquires information about SAN system construction from the host computers 10, 20, 30, storage controller 40 and fiber channel Fabric 60 via LAN 61.

In addition, at step 506, for the case in which vendor registration mode is selected, the control memory previously stores the Company_ID of each vendor, and thus it can be known that a new WWN corresponds to a particular host computer of a certain vendor. Therefore, even at the time of initial setting, by only mode selection it is possible that the supervisor generates the security table 201 without entering the presence or absence of access right.

A description will be made of the case where a new host computer is added to the operating computer system with reference to FIGS. 1 and 6. In the system construction shown in FIG. 1, it is assumed that the host computer 30 is added under the operation of the system that has no host computer 30. When the host computer 30 is newly connected to the system, i.e., when the cable connected to the host bus adapter (not shown) of host computer 30 is connected to the switch 60 of the fiber channel Fabric, fabric login FLOGI is executed between the host computer 30 and the switch. The fiber channel Fabric switch 60 sends to all connected devices, RSCN (Registered State Change Notification) that indicates change of state (step 601). The microprocessor 42 of the storage controller 40 that has received this notification transmits an ACC (Accept) frame (step 602).

Since the added host computer does not correspond to any one of the host computers under login, Get Port Name (GPN_ID) is transmitted to the host computer 30 to request N_Port_Name information (step 603). Since the received N_Port_Name information is of course not registered even referring to the N_Port_Name information list of security table 200, the N_Port_Name information of the added host computer 30 is stored in the port security table 200 (step 604).

Since the S_ID of the host computer 30 is not acquired yet, the storage controller 40 cannot accept the access by the host computer 30 under this condition. Therefore, the supervisor assigns the host computer, and makes it be enabled to access by use of panel 47. The supervisor requires to execute a port security change task for port P0 on the panel 47 in order that the host computer 30 can be enabled to access via port P0 of front end control unit 41. As a result, the N_Port_Name information is displayed on the security table 200 at the N_Port_Name item column.

When Host C is selected as the automatically registered N_Port_Name information of the host bus adapter 31 of host computer 30 in response to GPN_ID, the port access permit/reject pair flag information can be changed on the table. The supervisor selects Enable, thus this host being enabled to access (step 605). Here, the host computer 30 can make re-recognition processing for the connected device (step 606). Then, login process is performed so that the S_ID corresponding to the host computer 30 can be acquired from the host computer 30. The storage regions 51, 52 under command of storage controller 40 can be accessed by the host computer 30. After the subsequent reception of PLOGI frame, the process of entering all items concerning the host computer 30 on the security table 200 ends.

Figure 6:
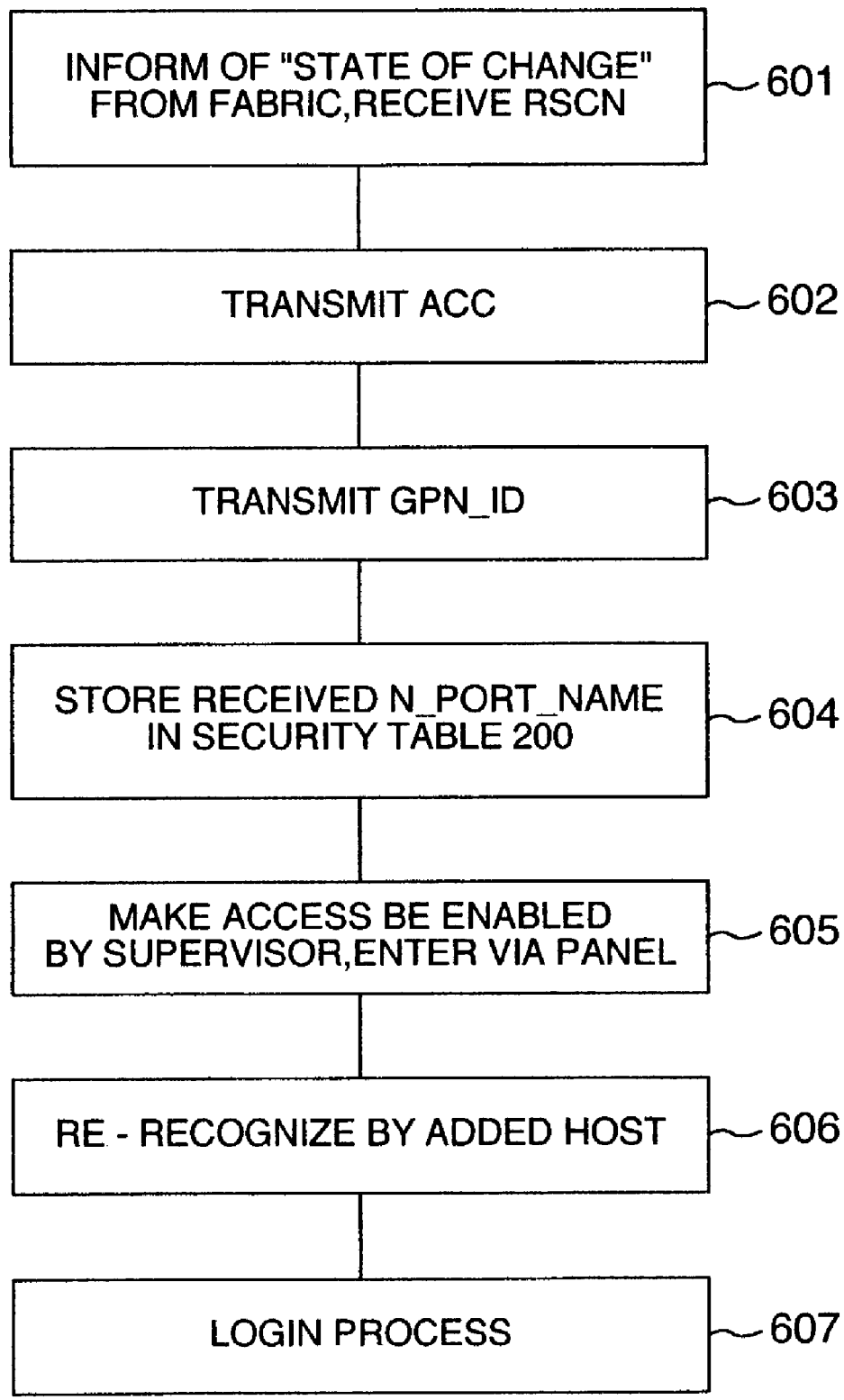
FIG. 6 is a flowchart for addition of a host computer to an operating computer system.

While N_Port_Name information is used for the description with reference to FIG. 6, WWN information may be used therefor.

In addition, while the security table (host information table) 200 and security table (access enable/disable table) 201 or 202 are shown as separate tables in FIGS. 7A through 7C, they are managed as one table as shown in FIG. 7D.

Figure 9:
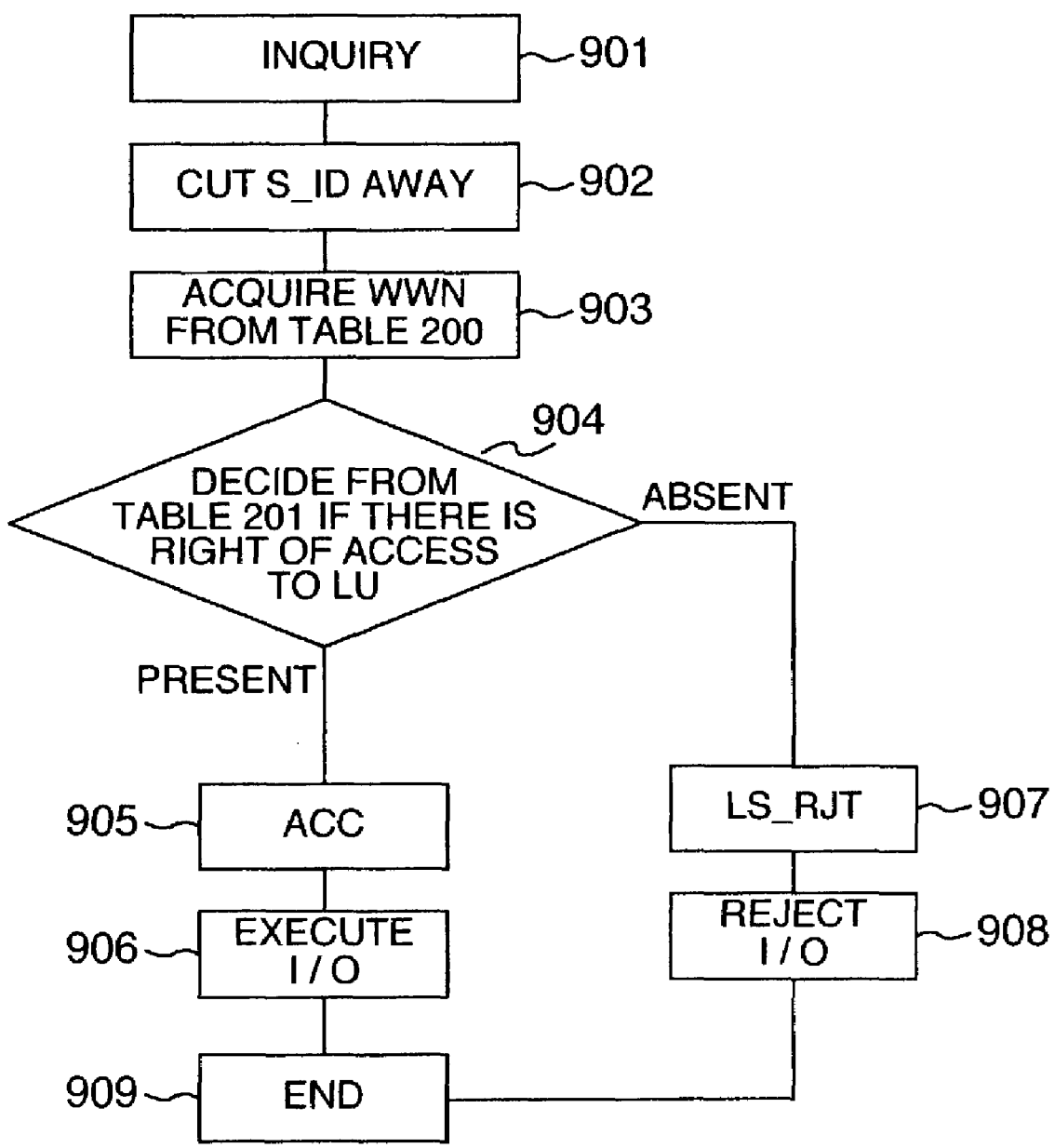
FIG. 9 is a flowchart for the process to INQUIRY command.

The execution of Inquiry command will be described with reference to FIG. 9. The Inquiry command is a command to inquire, before the start of I/O process, the installation of the logic devices associated with the process. Specifically, this command is a request to inquiry information before the host computer issues a request to access to the storage region LU under command of storage controller 40. This command is a standard command that is surely supported in SCSI.

The detailed format of frame header 72 will be described. The host computer to access to LU sends a frame including Inquiry command to the storage controller 40 having the LU to be accessed (step 901). This frame includes the S_ID 82 of the host and LUN as an LU identifier for inquiry assigned in PLOGI.

To issue Inquiry and execute I/O, the S_ID 82 is cut off out of the Inquiry frame (step 902). Then, the N_Port_Name corresponding to the S_ID 82 is acquired from the security table 200 showing the relation between N_Port_Name (or WWN) and S_ID 82. Thus, it is decided which host computer has issued Inquiry (step 903).

In addition, from the security table 201 it is decided if the decided host computer has right to access to the LU for I/O (step 904). If it has right, ACC is sent back to the host computer that has issued Inquiry for access (step 905). Then, I/O process is performed (step 906). If it has no right, LS_RJT is transmitted back to the host computer (step 907), rejecting I/O request (step 908).

Thus, I/O process is accepted or rejected, and Inquiry ends (step 909).

Figure 10:
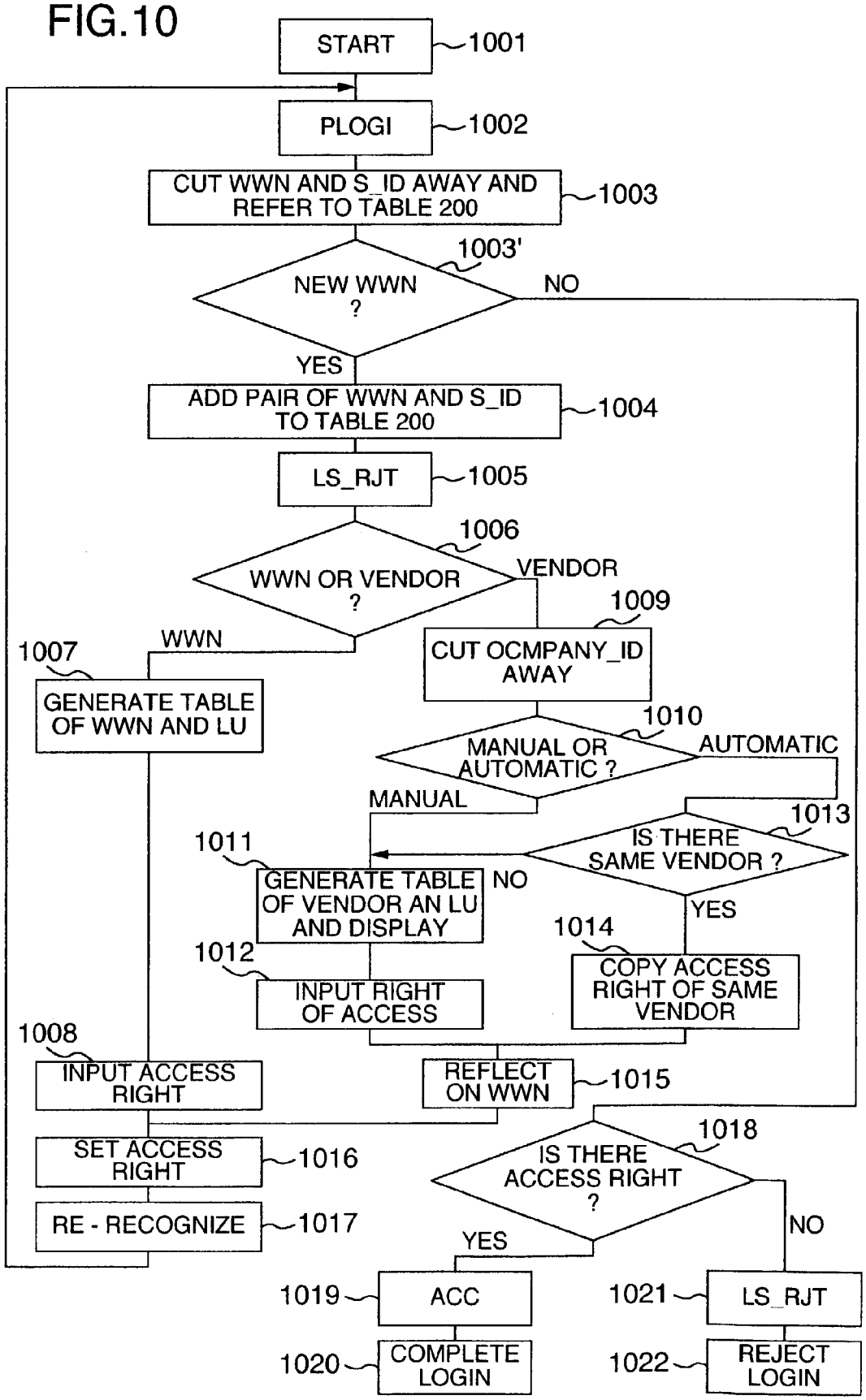
FIG. 10 is a flowchart for the process having a security table auto-setting mode.

With reference to FIG. 10, a description will be made of another embodiment having the function for the mode in which security setting is automatically registered in addition to the registration of host computers.

Figure 5:
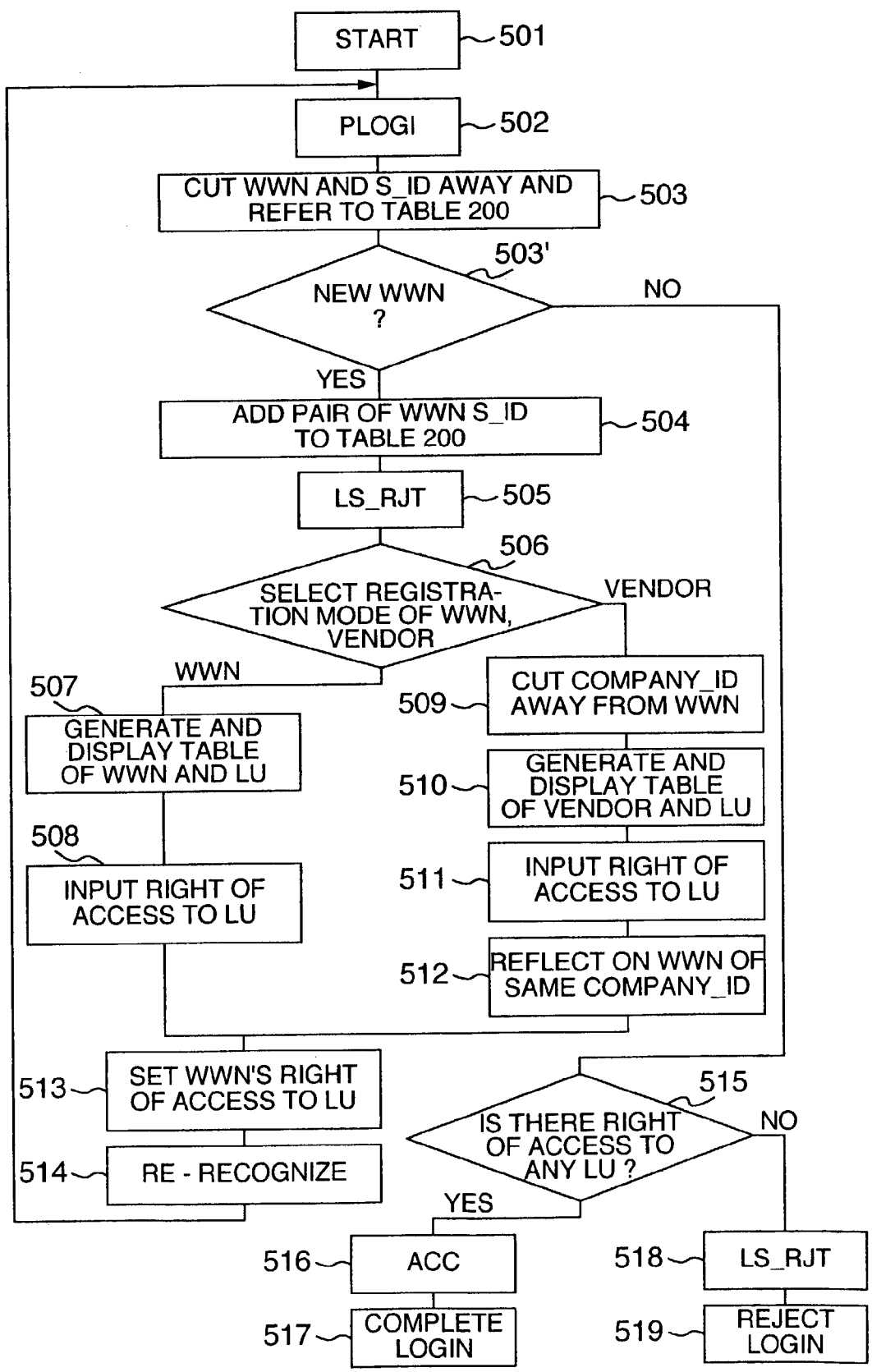
FIG. 5 is a flowchart for log-in, and security table registration and setting.

Steps 1001 through 1009 are the same as steps 501 through 509 given in FIG. 5, and thus will not be described.

After clipping Company_ID at step 1009, the user decides to select manual or automatic security registration (step 1010).

If manual registration is selected, steps 1011 and 1012 are executed. These steps are the same as steps 510 and 511 shown in FIG. 5, and thus will not be described.

If automatic registration is selected, the microprocessor 42 checks if the host computers registered on the security table 200 include the same one as Company_ID of new WWN (step 1013).

If there is not, the automatic setting of security cannot be made, and thus the process goes to step 1011 as in the manual setting. If there is the same Company_ID, the security setting of that Company_ID is copied as a Company_ID of new WWN, thus the access enable/disable setting input for that host being omitted (step 1014).

Step 1015 and the following steps after generating security table for each vendor are the same as step 515 and the following steps shown in FIG. 5, and thus will not be described.

Figure 11:
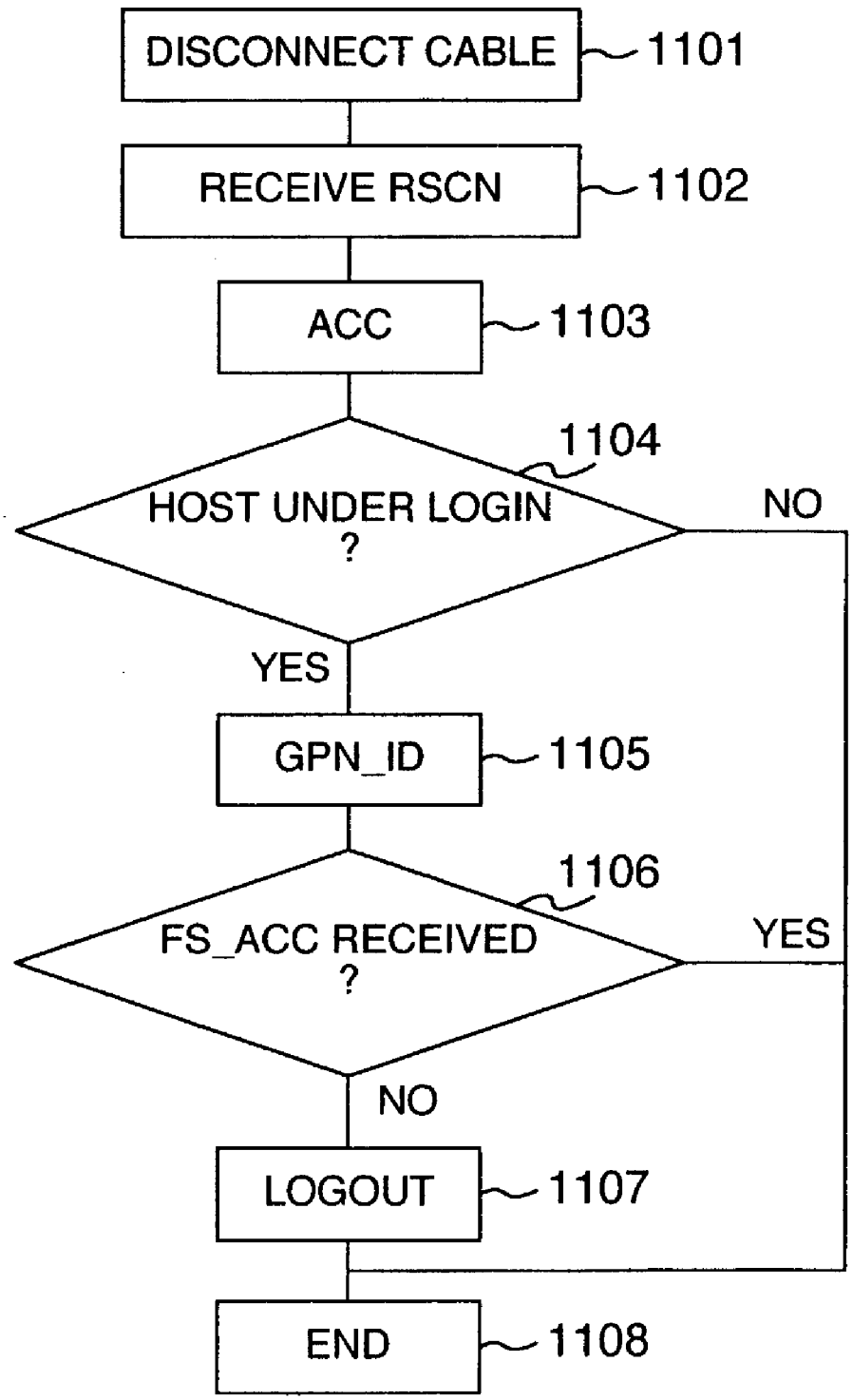
FIG. 11 is a flowchart for the process taken when a device intermits.

Description will be made of the case where a host computer is temporarily stopped or a host bus adapter is replaced due to failure in the operating computer system, with reference to FIG. 11.

When a certain host computer is extracted from the system (step 1101), or when the cable connected to the host computer is disconnected from the switch of Fabric 60, the switch (not shown) of fiber channel 60 sends RSCN indicating change of state to all connected devices (step 1102). The storage controller 40 that has received this notification sends accept (ACC) frame (step 1103). The storage controller 40 confirms if the host computer informed of by the received RSCN exists in the host computers now under login (step 1104). If there is, GPN_ID is sent to that host computer (step 1105).

The host computer extracted from the system is disconnected, and thus cannot respond to GPN_ID. Therefore, the storage controller 40 cannot receive accept (FS_ACC) (step 1106). Thus, the storage controller 40 internally executes logout process for this host computer. Then, it changes the access enable/disable flag information of security table 201 to Disable, or makes that host be disabled to access (step 1107). When the host is again connected after replacing the host bus adapter, N_Port_Name information is changed, and thus the same mode as the new provision/addition of a host is brought about.

Here, at step 1107 it is possible to set not to change the access enable/disable flag information of security table 201. Then, if the host computer is temporarily stopped or resumes its operation after having been completely repaired, it can access to the same storage region as before the stop without again setting security table 201. The host bus adapter replacement process involves the connection and disconnection of the cable of the same port. Thus, under the mode of "deciding host adapter replacement due to failure", automatic access setting can be made without enabling access on panel 47 by supervisor. On the contrary, under the mode of "access enable/disable", addition process is executed as in the embodiment for host addition.

Figure 12:
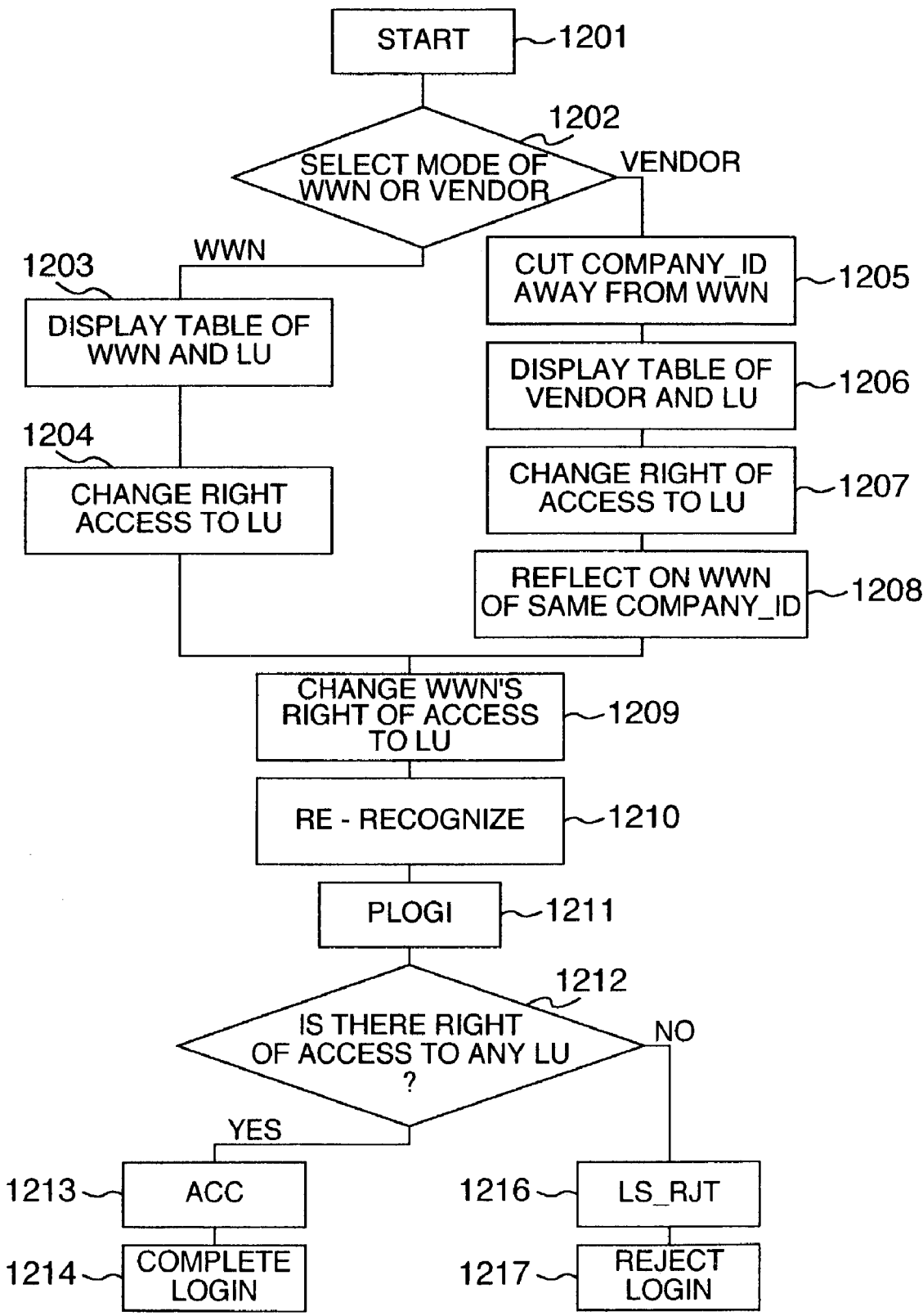
FIG. 12 is a flowchart for security table change and re-login.

LU security change will be described with reference to FIG. 12. The security table 201 or 202 is started to change by use of panel 47 shown in FIG. 8 (step 1201). First, change for each WWN or each vendor is selected as a change mode (step 1202).

When change for each WWN is selected, the microprocessor 42 controls panel 47 to indicate a list of host computers on the display 471 (step 1203). Then, the supervisor operates the key buttons 472 to change the access enable/disable conditions of host to be changed (step 1204).

When change for each vendor is selected, the microprocessor 42 cuts Company_ID away from WWN of host information table 200, and generates the security table (access enable/disable table) 202 showing the access enable/disable conditions of vendors (step 1205). Then, the vendor-access security table 202 is indicated on the display 471 of panel 47 (step 1206). The supervisor operates the key buttons 472 to change the access enable/disable conditions of a vendor to be changed (step 1207). The microprocessor 42, on the basis of the results, searches for the WWN having the Company_ID of the vendor changed, and makes the access enable/disable table have the same contents as at step 1204 (step 1208).

Then, the microprocessor 42 changes the security table 201 (step 1209). Moreover, it issues a command for re-recognition to the host computer (step 1210). The host computer sends PLOGI in response to this command, leading to login (step 1211). In order to make the access enabled host be disabled, it is necessary that the host computer to be disabled to access be internally made logout by the storage controller 40 before the re-recognition process.

While in the above three examples, the access enable/disable operations are made for each LU unit of front end control unit 41 of storage controller 40, it is possible to make setting not for each LU but for each storage controller 40. In that case, the accessed ones of the security table 201 are not LU but storage controller 40. Moreover, when the front end control unit 41 has a plurality of ports, the access right of host is set for each port, thereby making it possible to avoid competition among host computers or provide priority to the host computers.

In addition the security system can also be constructed by transferring the security table 201, after being generated by the storage controller 40, to the host computers, and making decision of whether they have access right from the table before the hosts themselves issue PLOGI and Inquiry. In this case, the host computers select only the access right portion of themselves from the security table sent from each storage controller and store it. Similarly, a security table may be provided within the switch or SAN manager provided between the host computer and the storage controller. Thus, the number of commands to be transferred to the fiber channel and commands that the storage controller handles can be decreased, and the I/O process can be more effectively performed.

Moreover, data damage due to the access from a different protocol, different file system or different OS usually occurs only at the time of data writing. If data reading is controlled to execute from the host computer that has other protocols and different file system, it will be often advantageous.

Therefore, it is possible that, as at steps 507 and 508 in FIG. 5, when the user is allowed to enter access right, read access and write access are separately set up so as to provide storage regions allowed only to be read or provide access right only for writing and free access for reading.

The same vendor sometimes manufactures host computers that have a plurality of different file types. In that case, use of Company_ID might fail to achieve the original security. At that time, a code for identifying OS or file type is added to Company_ID, and this Company_ID can be used to substitute for the Company_ID described in the previous embodiments.

It is also possible to detect the protocol, file type and OS of host from PLOGI not using N_Port_Name for identifying the host computers, and to use these identification information for Company_ID, so that the same access right can be provided to the host computers of the same file type.

While a single storage controller and two LUs are used in the above embodiments for the sake of simple explanation, the present invention can be applied to a system having a plurality of storage controllers, or three or more LUs. In this case, the security setting can be of course simplified. Moreover, the storage region may be logical volume unit, RAID group unit, or physical region or physical volume unit that is not a logically divided unit, other than LU unit. In addition, as in the case where there are provided a plurality of storage units and a plurality of storage controllers, but logically one storage unit and one storage controller, multiple host computers, storage controllers and storage units include the meaning of being both logically multiple and physically multiple ones.

Furthermore, the recording media may be optical disks or magnetooptical disks other than magnetic disks, or magnetic tape other than disks. The technical field to be applied is not limited to the relation between the host computer and storage controller, but to the relation between other information processors that are required to provide access limitation.

What is claimed is:

1. A storage system comprising:
   a control unit for receiving a data write request from a plurality of host computers;
   at least one storage unit coupled to said control unit and having a plurality of storage regions for storing data; and
   a panel displaying information of relationships between host group identifiers (IDs) of groups of host computers each group having one or more host computers and said storage regions connected to said groups of host computers,
   wherein said control unit has an access security table indicating, a relationship between said groups of host computers and said storage regions accessible to said groups of host computers, and
   wherein said panel displays information of a relationship between said host group IDs of groups of host computers and said storage regions accessible to each group of host computers on said panel so that an administrator can set an access enable/disable right for said groups of host computers to permit access or not permit access of said storage regions using said host group IDs without inputting a World Wide Name (WWN) of each of said host computers when said administrator sets said enable/disable right on said panel to be input to said access security table.

2. A storage system according to claim 1, wherein said access security table is made and then said administrator chooses access enable/disable right in a Port Login (PLOGI) sequence.

3. A storage system according to claim 1, wherein Port Login (PLOGI) is acknowledged if there is an access enable right related to at least one of said storage regions corresponding to said host computer which sent a PLOGI frame in said access security table, when said control unit receives said PLOGI frame.

4. A storage system according to claim 3, wherein when said storage control unit receives an INQUIRY command from said host computer, said PLOGI of said host computer is acknowledged, and
   wherein said control unit judges if a logical unit number of a storage region in said INQUIRY command matches an access enable right of said access security table, and acknowledges said INQUIRY command from said host computer to said storage region if matches.

5. A storage system according to claim 1, further comprises:
   a host information table which sets relations between said WWNs of said host computers and Source Identifiers (S_IDs) of said host computers,
   wherein said host information table is made at Port Login (PLOGI) sequence.

6. A storage system comprising:
   a control unit for receiving a data write request from a plurality of host computers;
   at least one storage unit coupled to said control unit and having a plurality of storage regions for storing data,
   wherein said control unit has an access security table indicating, with respect to groups of host computers each group having one or more host computers, a relationship between said groups of host computers and said storage regions accessible to said groups of host computers; and
   a panel which displays information of a relationship between host group identifiers (IDs) of said groups of host computers and said storage regions accessible to said groups of host computers so that an administrator can set an access enable/disable right for said groups of host computers to permit access or not permit access of said storage regions using said host group (IDs) without inputting a World Wide Name (WWN) of each of said host computes when said administrator sets said enable/disable right on said panel to be input to said access security table.

7. A storage system according to claim 6, wherein said access security table is made and then said administrator chooses access enable/disable right in a Port Login (PLOGI) sequence.

8. A storage system according to claim 6, wherein Port Login (PLOGI) is acknowledged if there is an access enable right related to at least one of said storage regions corresponding to said host computer which sent a PLOGI frame in said access security table, when said control unit receives said PLOGI frame.

9. A storage system according to claim 8, wherein when said control unit receives an INQUIRY command from said host computer, said PLOGI of said host computer is acknowledged, and
   wherein said control unit judges if a logical unit number of a storage region in said INQUIRY command matches an access enable right of said access security table, and acknowledges said INQUIRY command from said host computer to said storage region if matches.

10. A storage system according to claim 6, further comprises:
a host information table which sets relations between said WWNs of said host computers and Source Identifiers (S_IDs) of said host computers,
wherein said host information table is made at Port Login (PLOGI) sequence.

11. A storage system comprising:
a control unit for receiving a data write request from a plurality of host computers of different vendors;
at least one storage unit coupled to said control unit and having a plurality of storage regions for storing data; and
a panel displaying information of relationship between host group identifiers (IDs) of vendors of said host computers and said storage regions connected to each vendor,
wherein said control unit has an access security table indicating a relationship between each vendor and each of said storage regions accessible to each vendor, and
wherein said panel displays information of relationship between said host group IDs of said vendors and said storage regions accessible to each vendor on said panel so that an administrator can set an access enable/disable right for each vendor to permit access or not permit access of each of said storage regions without inputting a World Wide Name (WWN) of each of said host computers when said administrator sets said enable/disable right on said panel to be input to said access security table.

12. A storage system according to claim 11, wherein said access security table is made and then said administrator chooses access enable/disable right in a Port Login (PLOGI) sequence.

13. A storage system according to claim 11, wherein Port Login (PLOGI) is acknowledged if there is an access enable right related to at least one of said storage regions corresponding to said host computer which sent a PLOGI frame in said access security table, when said control unit receives said PLOGI frame.

14. A storage system according to claim 13, wherein when said control unit receives an INQUIRY command from said host computer, said PLOGI of said host computer is acknowledged, and
wherein said storage control unit judges if a logical unit number of a storage region in said INQUIRY command matches an access enable right of said access security table, and acknowledges said INQUIRY command from said host computer to said storage region if matches.

15. A storage system according to claim 11, further comprises:
a host information table which sets relations between said WWNs of said host computers and Source Identifiers (S_IDs) of said host computers,
wherein said host information table is made at Port Login (PLOGI) sequence.

16. A storage system comprising:
a control unit for receiving a data write request from a plurality of host computers having different file formats;
at least one storage unit coupled to said control unit and having a plurality of storage regions for storing data; and
a panel displaying information of relationship between host group identifiers (IDs) corresponding to file format information of said host computers and said storage regions connected to each of said host computers,
wherein said control unit has an access security table indicating relationship between each file format information of said host computers and each of said storage regions accessible to each of said host computers, and
wherein said panel displays information of relationship between host group IDs corresponding to file format information of said host computers and said storage regions accessible to each of said host computers on said panel so that an administrator can set an access enable/disable right for each file format information of said host computers to permit access or not permit access of each of said storage regions without inputting a World Wide Name (WWN) of each of said host computers when said administrator sets said enable/disable right on said panel to be input to said access security table.

17. A storage system according to claim 16, wherein said access security table is made and then said administrator chooses access enable/disable right in a Port Login (PLOGI) sequence.

18. A storage system according to claim 16, wherein Port Login (PLOGI) is acknowledged if there is an access enable right related to at least one of said storage regions corresponding to said host computer which sent a PLOGI frame in said access security table, when said control unit receives said PLOGI frame.

19. A storage system according to claim 18, wherein when said control unit receives an INQUIRY command from said host computer, said PLOGI of said host computer is acknowledged, and
wherein said control unit judges if a logical unit number of a storage region in said INQUIRY command matches an access enable right of said access security table, and acknowledges said INQUIRY command from said host computer to said storage region if matches.

20. A storage system according to claim 16, further comprises:
a host information table which sets relations between said WWNs of said host computers and Source Identifiers (S_IDs) of said host computers,
wherein said host information table is made at Port Login (PLOGI) sequence.

21. A storage system comprising:
a control unit for receiving a data write request from a plurality of host computers having different Operating Systems (OS's);
at least one storage unit coupled to said control unit and having a plurality of storage regions for storing data; and
a panel displaying information of relationship between host group identifiers (IDs) corresponding to OS of said host computers and said storage regions connected to each of said host computers,
wherein said control unit has an access security table indicating relationship between each OS of said host computers and each of said storage regions accessible to each of said host computers, and
wherein said panel displays information of relationship between host group IDs corresponding to OSs of said host computers and said storage regions accessible to each of said host computers on said panel so that an administrator can set an access enable/disable right for each OS of said host computers to permit access or not permit access of each of said storage regions without inputting a World Wide Name (WWN) of each of said host computers when said administrator sets said enable/disable right on said panel to be input to said access security table.

22. A storage system according to claim 21, wherein said access security table is made and then said administrator chooses access enable/disable right in a Port Login (PLOGI) sequence.

23. A storage system according to claim 21, wherein Port Login (PLOGI) is acknowledged if there is an access enable right related to at least one of said storage regions corresponding to said host computer which sent a PLOGI frame in said access security table, when said control unit receives said PLOGI frame.

24. A storage system according to claim 23, wherein when said control unit receives an INQUIRY command from said host computer, said PLOGI of said host computer is acknowledged, and wherein said storage control unit judges if a logical unit number of a storage region in said INQUIRY command matches an access enable right of said access security table, and acknowledges said INQUIRY command from said host computer to said storage region if matches.

25. A storage system according to claim 21, further comprises:

a host information table which sets relations between said WWNs of said host computers and Source Identifiers (S_IDs) of said host computers, wherein said host information table is made at Port Login (PLOGI) sequence.

* * * * *